United States Patent
Lindsey et al.

(10) Patent No.: US 6,317,717 B1
(45) Date of Patent: Nov. 13, 2001

(54) VOICE ACTIVATED LIQUID MANAGEMENT SYSTEM

(76) Inventors: Kenneth R. Lindsey, 3210 Teakwood Cir., Louisville, KY (US) 40216; Cynthia Kaelin, 1512 Shingo Ave., Louisville, KY (US) 40215; Christopher A. Cooper, 304 Toll View Dr., Shepherdsville, KY (US) 40165

( * ) Notice: Subject to any disclaimer, the term of this patent is extended or adjusted under 35 U.S.C. 154(b) by 0 days.

(21) Appl. No.: 09/258,326

(22) Filed: Feb. 25, 1999

(51) Int. Cl.[7] ............ G10L 21/00; G05D 23/13; E03C 1/04; F16K 37/00
(52) U.S. Cl. .......... 704/275; 704/270; 236/12.12; 4/623; 4/192; 251/129.04; 137/607; 137/559; D10/103
(58) Field of Search .................. 704/270, 271, 704/272, 274, 275; 236/12.12; 251/129.04; 4/678, 615, 663, 313, 559, 570, 622, 675, 676, 682; 137/801, 337, 624.11, 625.17, 4, 607, 559; 700/283; D10/103

(56) References Cited

U.S. PATENT DOCUMENTS

| | | | |
|---|---|---|---|
| D. 393,808 | * 4/1998 | Lindsey et al. .......... | D10/103 |
| 4,563,780 | * 1/1986 | Pollack .................. | 4/192 |
| 4,931,938 | * 6/1990 | Hass .................... | 700/32 |
| 5,170,361 | * 12/1992 | Reed ................... | 700/283 |
| 5,184,642 | * 2/1993 | Powell ................. | 137/607 |
| 5,535,779 | * 7/1996 | Huang .................. | 137/559 |
| 5,868,311 | * 2/1999 | Cretu-Petra ........... | 236/12.12 |
| 5,945,910 | * 8/1999 | Gorra .................. | 340/573.1 |

FOREIGN PATENT DOCUMENTS

| | | | | |
|---|---|---|---|---|
| 3218719 A | * | 9/1991 | (JP) | A47K/3/22 |
| 20-00136555 A | * | 5/2000 | (JP) | E03C/1/05 |
| 3024383 A | * | 2/1991 | (JP) | F16K/31/06 |

OTHER PUBLICATIONS

World Wide Web page of "Black Bean Communications Ltd." describing "BBEAN 393– EugeneCRet–GP–FE Wonder Faucet, hands–free, voice activated". Dated Dec. 18, 2000. City and state unknown.

World Wide Web page of "EL–CO Electronics" descibing "World's First Adjustable Hands–Free Faucets". Dated Dec. 18, 2000. 32619 Clairview Dr., Farmington Hills, MI 48334.

* cited by examiner

Primary Examiner—Tālivaldis Ivars Šmits
Assistant Examiner—Vijay B Chawan (57) ABSTRACT

A voice activated faucet is provided with a valve coupled between the faucet and a water line for allowing water to flow to the faucet upon the actuation thereof. Further provided is a voice recognition mechanism including a microphone for receiving and recognizing at least one audio signal. Also included is a control mechanism connected to the valve and voice recognition mechanism for actuating the valve upon the recognition of the audio signal by the valve.

9 Claims, 5 Drawing Sheets

VOICE ACTIVATED LIQUID MANAGEMENT SYSTEM

BACKGROUND OF THE INVENTION

1. Field of the Invention

The present invention relates to water faucet switches and more particularly pertains to a new voice activated liquid management system for allowing the control of a faucet by way of vocalizing.

2. Description of the Prior Art

The use of water faucet switches is known in the prior art. More specifically, water faucet switches heretofore devised and utilized are known to consist basically of familiar, expected and obvious structural configurations, notwithstanding the myriad of designs encompassed by the crowded prior art which have been developed for the fulfillment of countless objectives and requirements.

Known prior art water faucet switches include U. S. Pat. Nos. 5,430,826; 5,335,313; 5,345,538; U.S. Pat. No. Des. 349,151; U.S. Pat. Nos. 4,854,498; and 5,441,075.

In these respects, the voice activated liquid management system according to the present invention substantially departs from the conventional concepts and designs of the prior art, and in so doing provides an apparatus primarily developed for the purpose of allowing the control of a faucet by way of vocalizing.

SUMMARY OF THE INVENTION

In view of the foregoing disadvantages inherent in the known types of water faucet switches now present in the prior art, the present invention provides a new voice activated liquid management system construction wherein the same can be utilized for allowing the control of a faucet by way of vocalizing.

The general purpose of the present invention, which will be described subsequently in greater detail, is to provide a new voice activated liquid management system apparatus and method which has many of the advantages of the water faucet switches mentioned heretofore and many novel features that result in a new voice activated liquid management system which is not anticipated, rendered obvious, suggested, or even implied by any of the prior art water faucet switches, either alone or in any combination thereof.

Figure 1:
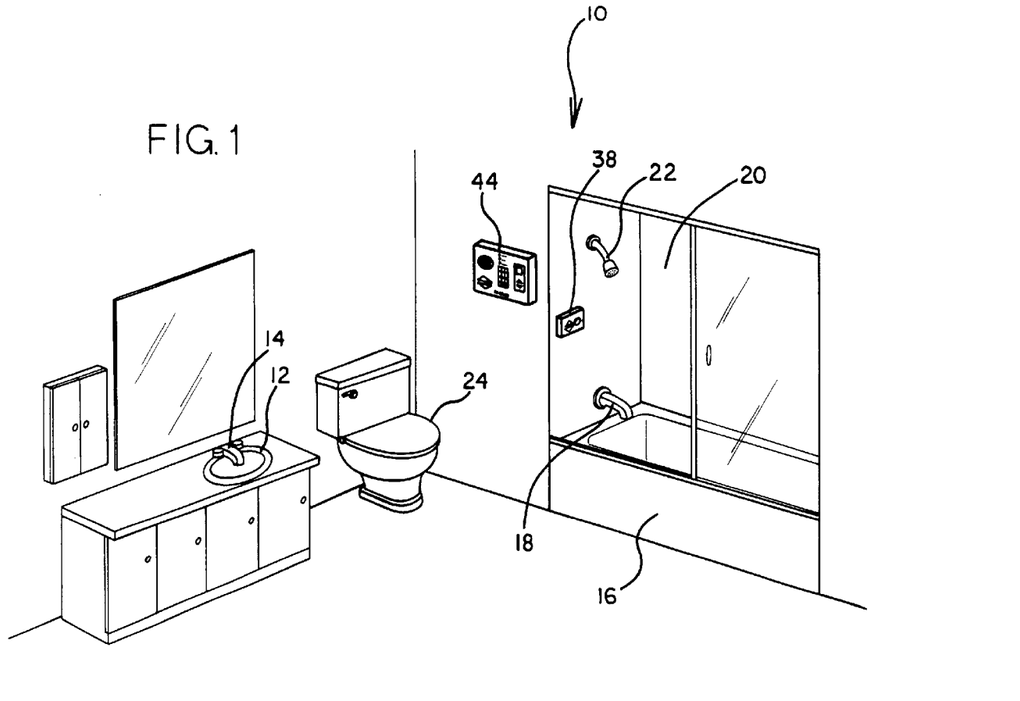
FIG. 1 is a perspective of a new voice activated liquid management system according to the present invention.
Figure 2:
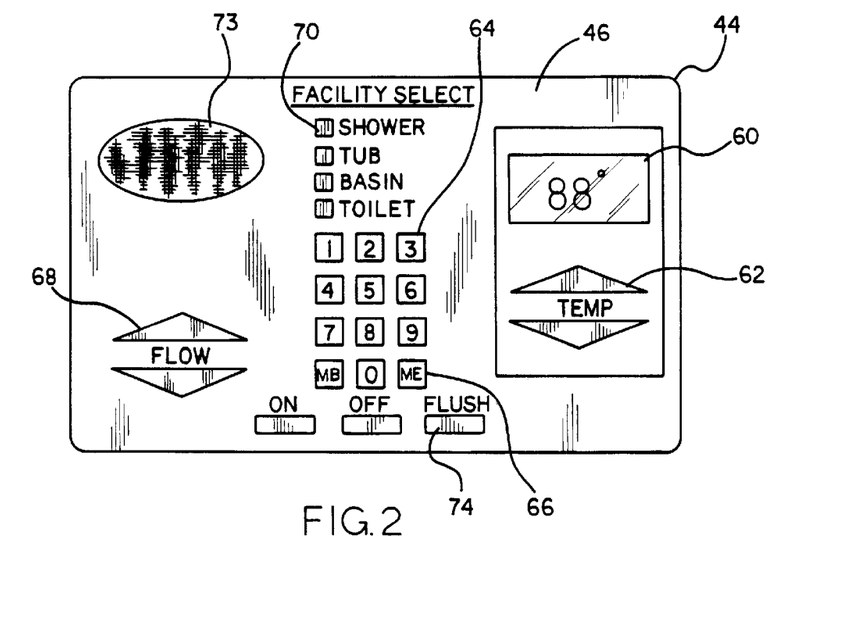
FIG. 2 is a front view of the central control panel of the present invention.
Figure 5:
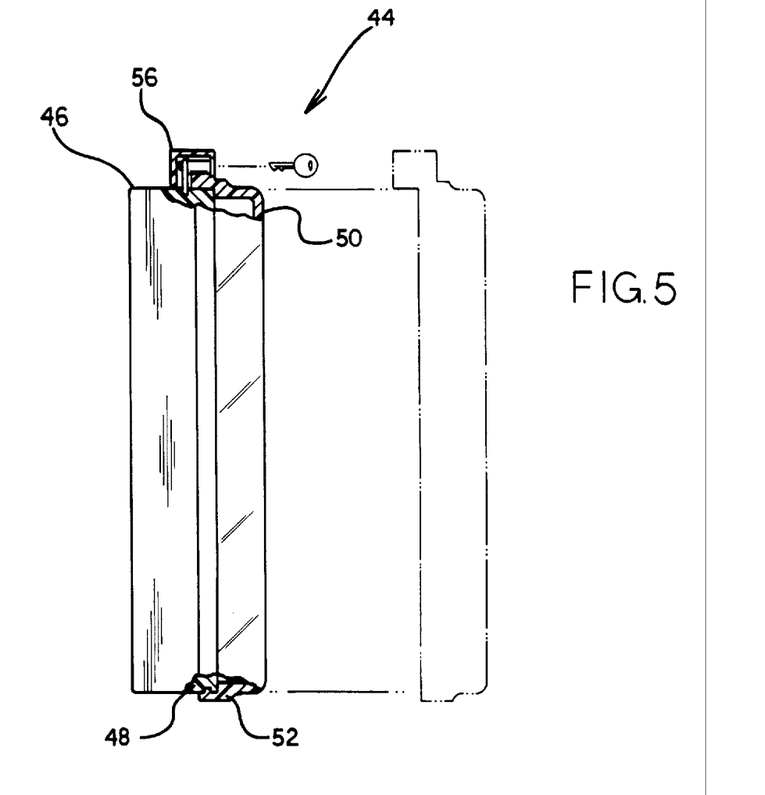
FIG. 5 is a side cross-sectional view of the central control panel of the present invention.
Figure 6:
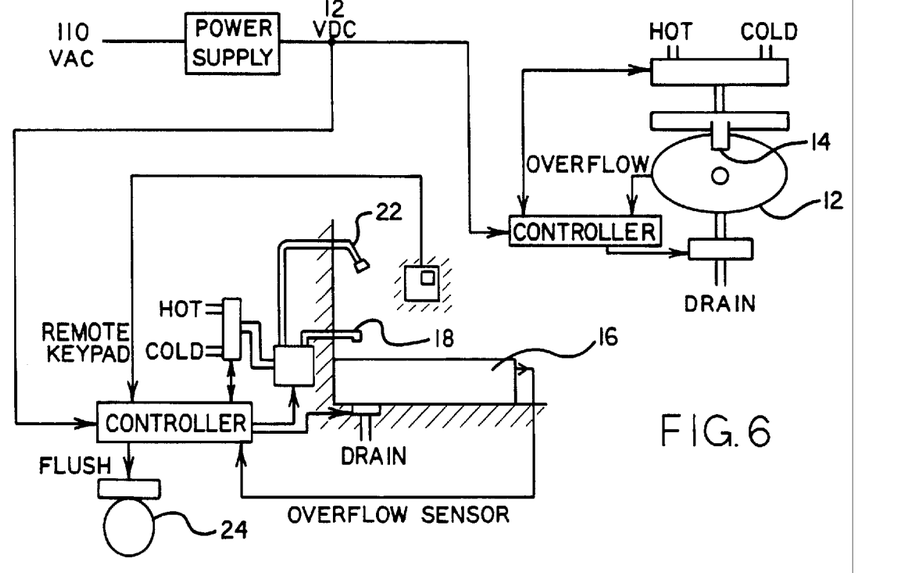
FIG. 6 is a general schematic of the present invention.
Figure 8:
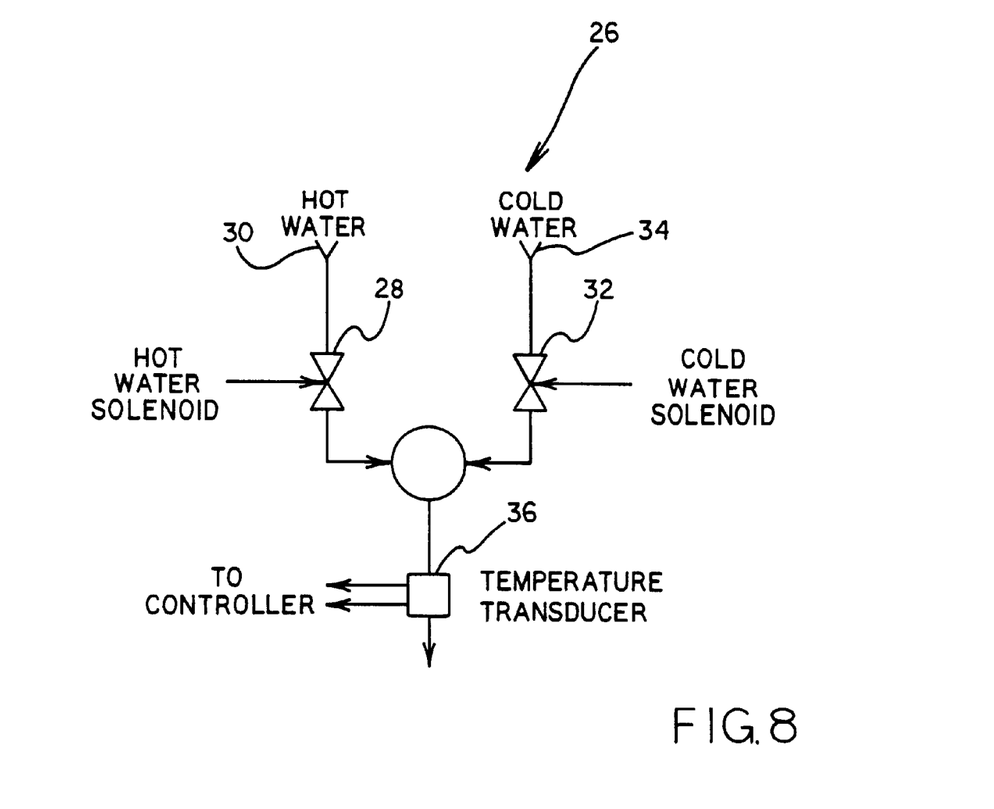
FIG. 8 is a diagram depicting one of the water control assemblies of the present invention.

To attain this, the present invention generally comprises a bathroom with a sink basin having a water outlet in the form of a faucet, a bath tub having a water outlet in the form of a spigot, and a shower having a water outlet in the form of a shower dispenser. See FIG. 1. Further provided is a toilet having a flush actuator adapted to flush the toilet upon the receipt of a flush signal. Also included is a plurality of water control assemblies, as shown in FIG. 8. Such assemblies include a sink basin water control assembly connected to the faucet of the sink basin, a bath tub water control assembly connected to the spigot of the bath tub, and a shower water control assembly connected to the shower dispenser of the shower. Each water control assembly has a hot water variable valve coupled between the respective water outlet and a hot water line for receiving hot water therefrom. Associated therewith is a cold water variable valve coupled between the respective water outlet and a cold water line for receiving cold water therefrom. A temperature transducer is situated between the variable valves and the respective water outlet. In use, the temperature transducer is adapted for generating a temperature signal representing a combined temperature of water received from the variable valves. It should be noted that the valves are adapted to allow the flow of water only upon the receipt of an activation signal. Next included is a remote control panel situated within the bath tub. Such remote control panel has a flow toggle switch adapted to generate a flow control signal. As shown in FIG. 2, a central control panel is positioned within the bathroom exterior of the bath tub. The central control panel includes a housing with a rectilinear configuration having a front face, a rear face, a top face, a bottom face, and a pair of side face therebetween defining an interior space. As shown in FIG. 5, the top face and bottom face each have a groove formed therein between the side faces. The control panel further comprises a front transparent panel with a pair of elongated protrusions formed on a top and a bottom face thereof. Such protrusion is adapted for slidably engaging with the grooves of the housing thereby allowing the transparent panel to cover the front face. The housing also has a locking means for precluding the removal of the transparent panel. The central control panel further includes a display for depicting a digital number representative of a temperature. A temperature toggle switch is situated below the display for allowing the incremental adjustment of a current temperature. Associated therewith is a numeric keypad having a plurality of numeric buttons for allowing the manual entering of a discrete number representative of the current temperature. Also positioned on the front face is a flow toggle switch adapted to generate a flow control signal. As shown in FIG. 2, a plurality of light emitting diodes are positioned on the front face. Such diodes are adapted to illuminate upon the actuation thereof. In the preferred embodiment, the light emitting diodes include a shower diode, a bath tub diode, a sink basin diode, and a toilet diode. A voice recognition mechanism is situated within the housing of the central control panel and includes a microphone situated on the front face for receiving unique audio signals. In use, the voice recognition means is adapted for generating control signals corresponding to the unique audio signals received via the speaker. The control signals include a "shower" signal, a "sink basin" signal, a "toilet signal" signal, a "flush" signal, a "temperature" signal, a "flow" signal, a "up" signal, "down signal", "on" signal, and "off" signal. Finally, control means is connected to the toilet, remote control panel, display, temperature toggle switch, flow toggle switch, numeric keypad, light emitting diodes, voice recognition mechanism and the valves of the water control assemblies. The control means is adapted to transmit to the sink basin, bath tub, and shower water control assemblies an activation signal and actuate the sink basin diode, the bath tub diode, the shower diode upon the receipt of the "sink basin", "bath tub", and "shower" signal, respectively, with the subsequent receipt of the "on" signal. This affords the flow of water from any of the water outlets with concurrent indication of which water outlet has been selected. The control means further serves to cease the transmission of the activation signal to the sink basin, bath tub, and shower water control assemblies and further cease the actuation of the corresponding diodes upon the receipt of the "sink basin", "bath tub", and "shower" signal, respectively, with the subsequent receipt of the "off" signal. The control means is further adapted to govern the valves of the water control assembly that is in receipt of the activation signal, or is dispensing water. Such governing entails maintaining a total water flow rate at a level indicative of the flow control signal. Further, the control means ensures that a proportion of water flow from the hot and cold water valves is such that the temperature signal received is representative of a temperature equal to the associated current temperature. This is accomplished by standard feedback methods. To allow the control of the temperature and flow rate while one of the water outlets is dispensing water, the current temperature of the sink basin, bath tub, and shower may be adjusted by the control means upon the receipt of the "sink basin", "bath tub", and "shower" signal, respectively, with at least one of the subsequent manipulation of the temperature toggle switches, manipulation of the keypad, receipt of the "temperature" and "up" signal, and receipt of the "temperature" and "down" signal. It should be noted that the toggle switch of the remote control panel only functions after the control means has received either the "bath tub" or "shower" signal. Similarly, the current water flow rate of the sink basin, bath tub, and shower may be adjusted by the control means upon the receipt of the "sink basin", "bath tub", and "shower" signal, respectively, with at least one of the subsequent manipulation of the flow rate toggle switch receipt of the "flow" and "up" signal, and receipt of the "flow" and "down" signal. Finally, the control means transmits the flush signal to the toilet and also actuates the toilet diode upon the receipt of the "flush" signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new voice activated liquid management system apparatus and method which has many of the advantages of the water faucet switches mentioned heretofore and many novel features that result in a new voice activated liquid management system which is not anticipated, rendered obvious, suggested, or even implied by any of the prior art water faucet switches, either alone or in any combination thereof.

It is another object of the present invention to provide a new voice activated liquid management system which may be easily and efficiently manufactured and marketed.

It is a further object of the present invention to provide a new voice activated liquid management system which is of a durable and reliable construction.

An even further object of the present invention is to provide a new voice activated liquid management system which is susceptible of a low cost of manufacture with regard to both materials and labor, and which accordingly is then susceptible of low prices of sale to the consuming public, thereby making such voice activated liquid management system economically available to the buying public.

Still yet another object of the present invention is to provide a new voice activated liquid management system which provides in the apparatuses and methods of the prior art some of the advantages thereof, while simultaneously overcoming some of the disadvantages normally associated therewith.

Still another object of the present invention is to provide a new voice activated liquid management system for allowing the control of a faucet by way of vocalizing.

Even still another object of the present invention is to provide a new voice activated liquid management system that includes a valve coupled between the faucet and a water line for allowing water to flow to the faucet upon the actuation thereof. Further provided is a voice recognition mechanism including a microphone for receiving and recognizing at least one audio signal. Also included is a control mechanism connected to the valve and voice recognition mechanism for actuating the valve upon the recognition of the audio signal by the valve.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, a new voice activated liquid management system embodying the principles and concepts of the present invention and generally designated by the reference numeral 10 will be described.

Specifically, the system 10 includes a bathroom with a sink basin 12 having a water outlet in the form of a faucet 14, a bath tub 16 having a water outlet in the form of a spigot 18, and a shower 20 having a water outlet in the form of a shower dispenser 22. See FIG. 1. Further provided is a toilet 24 having a flush actuator 25 adapted to flush the toilet upon the receipt of a flush signal.

Also included is a plurality of water control assemblies 26, as shown in FIG. 8. Such assemblies include a sink basin water control assembly connected to the faucet of the sink basin, a bath tub water control assembly connected to the spigot of the bath tub, and a shower water control assembly connected to the shower dispenser of the shower. Each water control assembly has a hot water variable valve 28 coupled between the respective water outlet and a hot water line 30 for receiving hot water therefrom. Associated therewith is a cold water variable valve 32 coupled between the respective water outlet and a cold water line 34 for receiving cold water therefrom. A temperature transducer 36 is situated between the variable valves and the respective water outlet. In use, the temperature transducer is adapted for generating a temperature signal representing a combined temperature of water received from the variable valves. It should be noted that the valves are adapted to allow the flow of water only upon the receipt of an activation signal.

Figure 3:
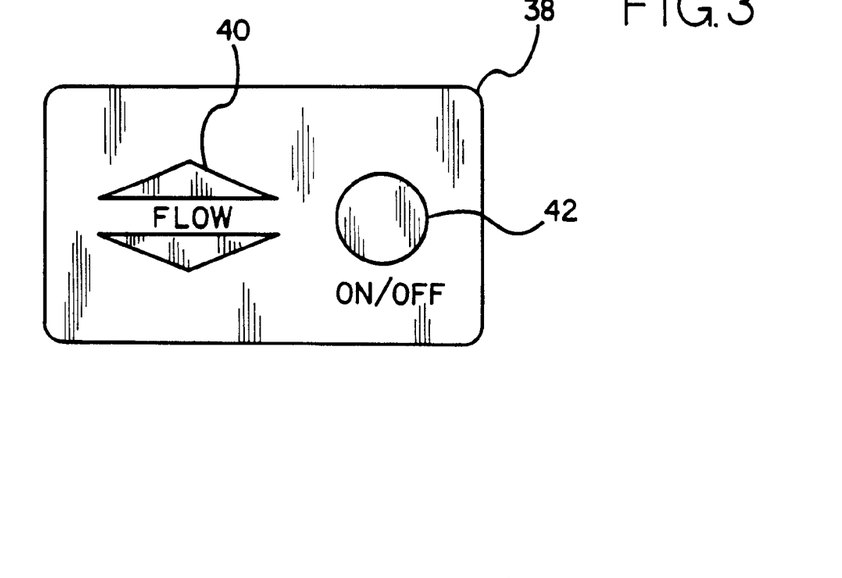
FIG. 3 is a front view of the remote control panel of the present invention.
Figure 4:
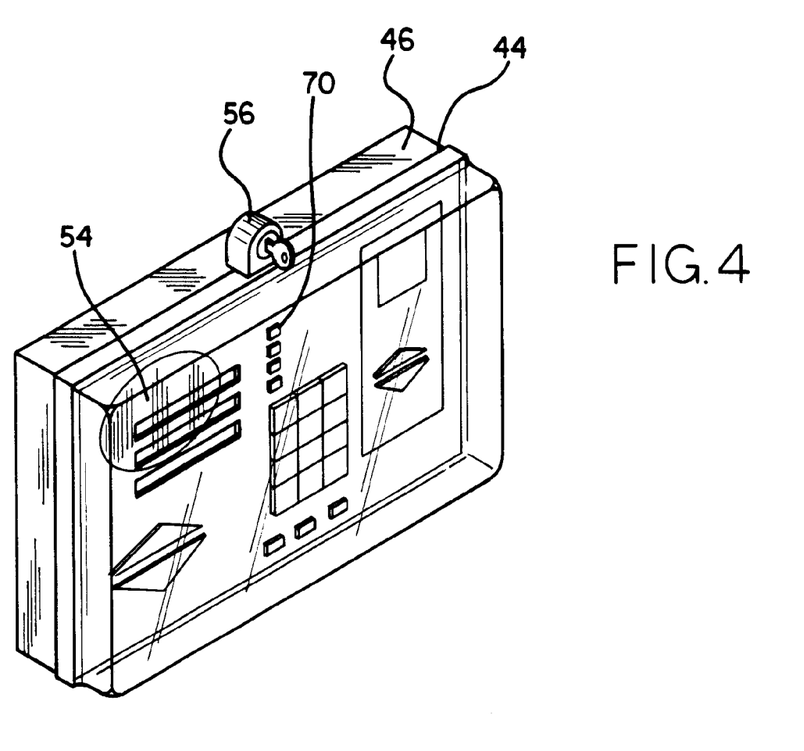
FIG. 4 is a perspective view of the central control panel with associated transparent panel.

Next included is a remote control panel 38 situated within the bath tub. Such remote control panel has a flow toggle switch 40 adapted to generate a flow control signal. A deactivation button 42 is also situated on the remote control panel.

Figure 7:
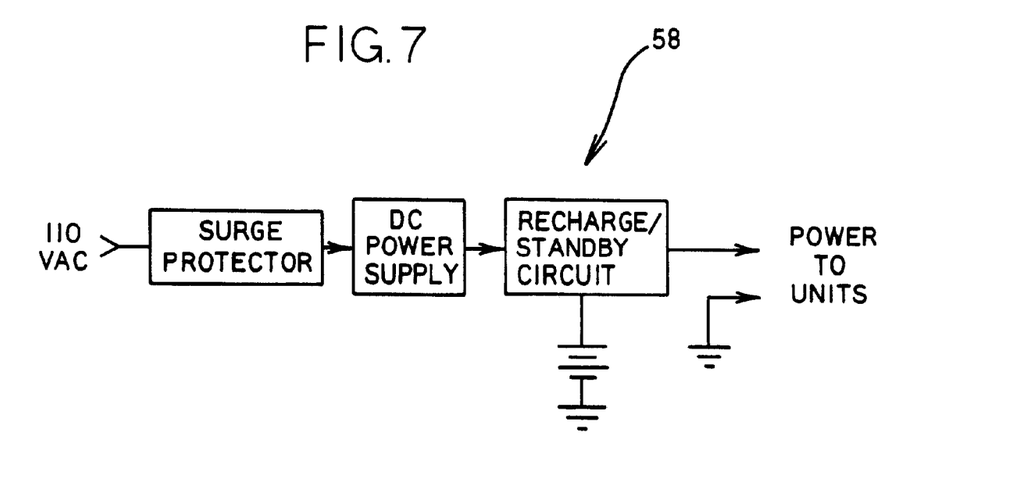
FIG. 7 is a schematic diagram of the surge protector of the present invention.

As shown in FIG. 2, a central control panel 44 is positioned within the bathroom exterior of the bath tub. The central control panel includes a housing 46 with a rectilinear configuration having a front face, a rear face, a top face, a bottom face, and a pair of side face therebetween defining an interior space. As shown in FIG. 5, the top face and bottom face each have a groove 48 formed therein between the side faces. The control panel further comprises a front transparent panel 50 with a pair of elongated protrusions 52 formed on a top and a bottom face thereof. Such protrusion is adapted for slidably engaging with the grooves of the housing thereby allowing the transparent panel to cover the front face. For reasons that will become apparent hereinafter, the transparent panel is preferably equipped with a plurality of small apertures 54 for allowing the passage of sound. The housing also has a locking means 56 for precluding the removal of the transparent panel. The locking means is preferably key actuated and includes any sort of standard arm and slot configuration for accomplishing its purpose. As shown in FIG. 7, the electrical components of the central control panel are powered with a surge protector circuit 58 for preventing electrical shock.

The central control panel further includes a display 60 for depicting a digital number representative of a temperature. A temperature toggle switch 62 is situated below the display for allowing the incremental adjustment of a current temperature. Associated therewith is a numeric keypad 64 having a plurality of numeric buttons for allowing the manual entering of a discrete number representative of the current temperature. As an option, memory buttons 66 may be included to store and recall specific temperatures stored in memory. Also positioned on the front face is a flow toggle switch 68 adapted to decrease or increase a flow control signal.

As shown in FIG. 2, a plurality of light emitting diodes 70 are positioned on the front face. Such diodes are adapted to illuminate upon the actuation thereof. In the preferred embodiment, the light emitting diodes include a shower diode, a bath tub diode, a sink basin diode, and a toilet diode. As will become apparent later, the diodes are included to indicate which of the water outlets is currently under the control of the user.

A voice recognition mechanism 72 is situated within the housing of the central control panel and includes a microphone 73 situated on the front face for receiving audio signals. Coupled to the microphone is a sensitivity dial 74 for determining the required volume of the audio signals. In use, the voice recognition means is adapted for generating control signals corresponding to the unique audio signals received via the speaker. Such audio signals and control signals are stored in read only memory 75. The control signals include a "shower" signal, a "sink basin" signal, a "toilet signal" signal, a "flush" signal, a "temperature" signal, a "flow" signal, a "up" signal, "down signal", "on" signal, and "off" signal.

Figure 9:
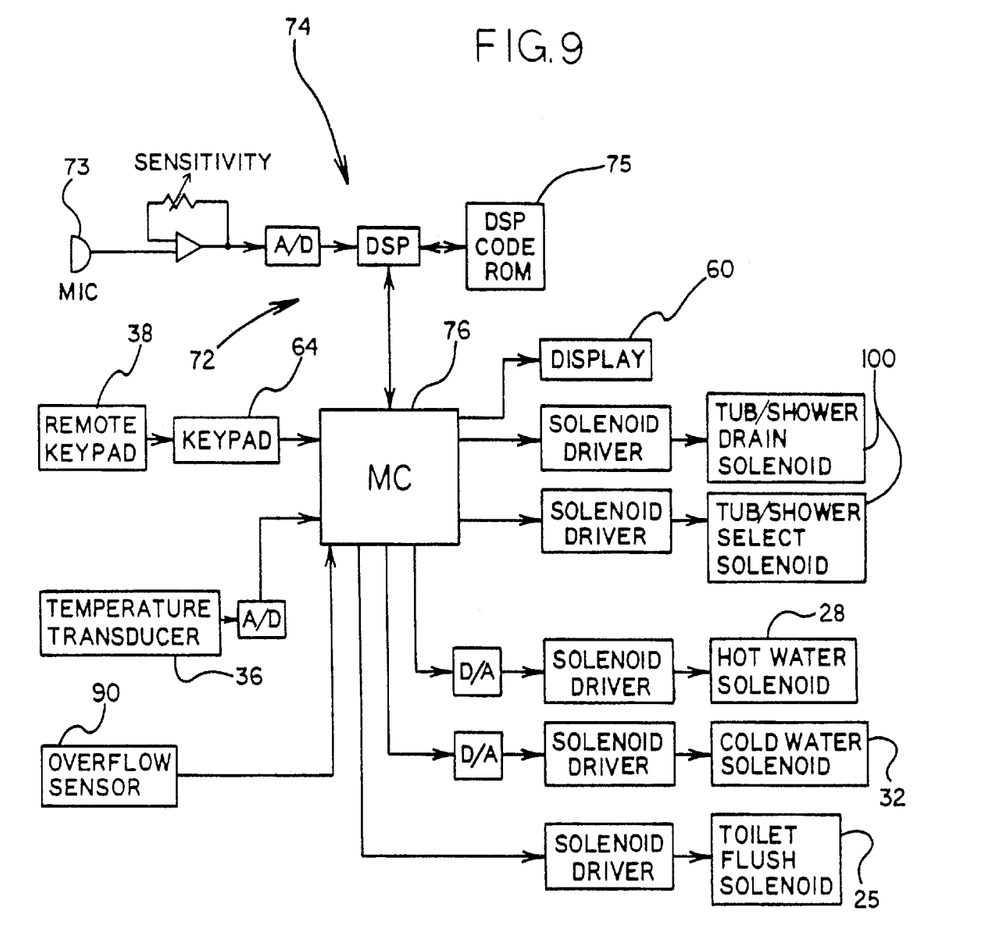
FIG. 9 is a detailed schematic diagram of the present invention.

Finally, control means 76, in the form of control circuitry, is connected to the toilet, remote control panel, display, temperature toggle switch, flow toggle switch, numeric keypad, light emitting diodes, voice recognition mechanism and the valves of the water control assemblies. The control means is adapted to transmit to the sink basin, bath tub, and shower water control assemblies an activation signal and actuate the sink basin diode, the bath tub diode, the shower diode upon the receipt of the "sink basin", "bath tub", and "shower" signal, respectively, with the subsequent receipt of the "on" signal. This affords the flow of water from any of the water outlets with concurrent indication of which water outlet has been selected. The control means further serves to cease the transmission of the activation signal to the sink basin, bath tub, and shower water control assemblies and further cease the actuation of the corresponding diodes upon the receipt of the "sink basin", "bath tub", and "shower" signal, respectively, with the subsequent receipt of the "off" signal.

In the preferred embodiment, both the bath tub and the sink basin are each equipped with an overflow sensor 90 in the form of an optical sensor or the like. Upon the detection of a potential overflow, the control means is automatically adapted to cease the transmission of the activation signal to the respective water outlet.

Yet another way of ceasing the transmission of the activation in the case of the shower dispenser and bathtub water faucet is the depression of the deactivation button the remote control panel. As shown in FIG. 9, the control means may optionally be connected to drain solenoids 100 associated with the sink basin and the bath tub for the purpose of allowing the automatic draining thereof upon the recitation of a drain command.

The control means is further adapted to govern the valves of any one of the water control assemblies that is in receipt of the activation signal, or in other words, is dispensing water. Such governing entails maintaining a total water flow rate at a level indicative of the flow control signal. Further, the control means ensures that a proportion of water flow from the hot and cold water valves is such that the temperature signal received is representative of a temperature equal to the associated current temperature. This is accomplished by standard feedback methods.

To allow the control of the temperature and flow rate while one of the water outlets is dispensing water, the current temperature of the sink basin, bath tub, and shower may be adjusted by the control means upon the receipt of the "sink basin", "bath tub", and "shower" signal, respectively, with the subsequent manipulation of the temperature toggle switches, manipulation of the keypad, receipt of the "temperature" and "up" signal, or receipt of the "temperature" and "down" signal. It should be noted that the toggle switch of the remote control panel only functions after the control means has received either the "bath tub" or "shower" signal.

Similarly, the current water flow rate of the sink basin, bath tub, and shower may be adjusted by the control means upon the receipt of the "sink basin", "bath tub", and "shower" signal, respectively, with the subsequent manipulation of the flow rate toggle switch receipt of the "flow" and "up" signal, or receipt of the "flow" and "down" signal. As such, the user may control the temperature and water flow rate of each outlet both manually and vocally.

The control means thus allows a user to select a water outlet which is desired to be controlled by simply stating its name. Control of the selected water outlet is afforded by simply stating a function desired. The light emitting diodes provide an indication of which water outlet is selected. As an option, yet another function may be provided wherein the central control panel may further allow the selection of a certain type of water flow from the shower dispenser.

Finally, the control means transmits the flush signal to the toilet and also actuates the toilet diode upon the receipt of the "flush" signal. A flush button 74 is also included on the central control panel for allowing the manual flushing of the toilet.

The present invention thus provides a system for allowing a user to more effectively utilize a bathroom facility. It is especially useful to handicap persons. It should be understood that the principles of the present invention may be readily applied to other areas within the house, namely a kitchen.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A voice activated bathroom system comprising, in combination:
   a bathroom including a sink basin having a water outlet in the form of a faucet, a bath tub having a water outlet in the form of a spigot, and a shower having a water outlet in the form of a shower dispenser, and a toilet having a flush actuator adapted to flush the toilet upon the receipt of a flush signal;
   a plurality of water control assemblies including a sink basin water control assembly connected to the faucet of the sink basin, a bath tub water control assembly connected to the spigot of the bath tub, and a shower water control assembly connected to the shower dispenser of the shower, the water control assemblies each having a hot water variable valve coupled between the respective water outlet and a hot water line for receiving hot water therefrom, a cold water variable valve coupled between the respective water outlet and a cold water line for receiving cold water therefrom, and a temperature transducer situated between the variable valves and the respective water outlet for generating a temperature signal representing a combined temperature of water received from the variable valves, whereby the valves are adapted to allow the flow of water only upon the receipt of an activation signal;
   a remote control panel situated adjacent to the bath tub having a flow toggle switch adapted to generate a flow control signal; and
   a central control panel positioned in the bathroom exterior of the bath tub, the central control panel including a housing with a rectilinear configuration having a front face, a rear face, a top face, a bottom face, and a pair of side faces therebetween defining an interior space, the central control panel further including:
      a display for depicting a digital number representative of a temperature,
      a temperature toggle switch situated below the display for allowing the incremental adjustment of a current temperature,
      a flow toggle switch adapted to generate a flow control signal,
      a numeric keypad having a plurality of numeric buttons for allowing the manual entering of a discrete number representative of the current temperature,
      a plurality of light emitting diodes adapted to illuminate upon the actuation thereof, the light emitting diodes including a shower diode, a bath tub diode, a sink basin diode, and a toilet diode,
      a voice recognition mechanism including a microphone situated on the front face of the control panel for receiving unique audio signals, the voice recognition means adapted for generating control signals corresponding to the unique audio signals received via the speaker, the control signals including a "shower" signal, a "sink basin" signal, a "toilet signal" signal, a "flush" signal, a "temperature" signal, a "flow" signal, a "up" signal, "down signal", "on" signal, and "off" signal, and
      control means connected to the toilet, remote control panel, display, temperature toggle switch, flow toggle switch, numeric keypad, light emitting diodes, voice recognition mechanism and the valves of the water control assemblies, the control means adapted to transmit to the sink basin, bath tub, and shower water control assemblies an activation signal and actuate the sink basin diode, the bath tub diode, the shower diode upon the receipt of the "sink basin", "bath tub", and "shower" signal, respectively, with the subsequent receipt of the "on" signal and further cease the transmission of the activation signal thereto and cease the actuation thereof upon the subsequent receipt of the "sink basin", "bath tub", and "shower" signal, respectively, with the subsequent receipt of the "off" signal, the control means further adapted to govern the valves of the water control assembly that is in receipt of the activation signal such that a total water flow rate thereby afforded is indicative of the flow control signal and a proportion of water flow from the hot and cold water valves is such that the temperature signal received is representative of a temperature equal to the associated current temperature, whereby the current temperature of the sink basin, bath tub, and shower may be adjusted upon the receipt of the "sink basin", "bath tub", and "shower" signal, respectively, with at least one of the subsequent manipulation of the temperature toggle switches, manipulation of the keypad, receipt of the "temperature" and "up" signal, and receipt of the "temperature" and "down" signal and the current water flow rate of the sink basin, bath tub, and shower may be adjusted upon the receipt of the "sink basin", "bath tub", and "shower" signal, respectively, with at least one of the subsequent manipulation of the flow rate toggle switch receipt of the "flow" and "up" signal, and receipt of the "flow" and "down" signal, the control means further adapted to transmit the flush signal to the toilet and also actuated the toilet diode upon the receipt of the "flush" signal; and prevention means for selectively preventing actuation of controls on the central control panel, the prevention means selectively covering the front face of the central control panel, the prevention means comprising a front panel slidably mounted on the central control panel, a groove being formed on each of the top and bottom faces of the central control panel, and a pair of elongated protrusions being formed on a top and a bottom face of the front panel of the central control panel, the front panel being transparent for permitting viewing of displays on the front face of the central control panel while actuation of the controls is being prevented, and a locking means for selectively precluding removal of the front panel from a position in front of the front face of the central control panel.

2. A voice activated faucet comprising:

a faucet;

a water line a valve coupled between the faucet and the water line for allowing water to flow to the faucet upon the actuation thereof;

a voice recognition mechanism including a microphone for receiving and recognizing at least one audio signal;

control means connected to the valve and voice recognition mechanism for actuating the valve upon the recognition of the audio signal by the valve, the control means including a central control panel having a plurality of controls thereon;

prevention means for selectively preventing actuation of controls on the central control panel;

wherein the prevention means selectively covers a front face of the central control panel.

3. A voice activated faucet as set forth in claim 2 wherein the prevention means comprises a front panel slidably mounted on the central control panel, a groove being formed on each of the top and bottom faces of the central control panel, and a pair of elongated protrusions being formed on a top and a bottom face of the front panel of the central control panel.

4. A voice activated faucet as set forth in claim 3 wherein the front panel is transparent for permitting viewing of displays on a front face of the central control panel while actuation of the controls is being prevented.

5. A voice activated faucet as set forth in claim 4 wherein the prevention means additionally comprises a locking means for selectively precluding removal of the front panel from a position in front of a front face of the central control panel.

6. A voice activated faucet comprising:

a toilet;

a water line a valve coupled between the toilet and the water line for allowing toilet to flush upon the actuation thereof;

a voice recognition mechanism including a microphone for receiving and recognizing at least one audio signal;

control means connected to the valve and voice recognition mechanism for actuating the valve upon the recognition of the audio signal by the valve, the control means including a central control panel having a plurality of controls thereon;

prevention means for selectively preventing actuation of controls on the central control panel;

wherein the prevention means selectively covers a front face of the central control panel.

7. A voice activated faucet as set forth in claim 6 wherein the prevention means comprises a front panel slidably mounted on the central control panel, a groove being formed on each of the top and bottom faces of the central control panel, and a pair of elongated protrusions being formed on a top and a bottom face of the front panel of the central control panel.

8. A voice activated faucet as set forth in claim 7 wherein the front panel is transparent for permitting viewing of displays on a front face of the central control panel while actuation of the controls is being prevented.

9. A voice activated faucet as set forth in claim 8 wherein the prevention means additionally comprises a locking means for selectively precluding removal of the front panel from a position in front of a front face of the central control panel.

* * * * *